United States Patent

[11] 3,622,036

[72] Inventor Mathieu Maurits Bongaerts
 Bree, Belgium
[21] Appl. No. 859,719
[22] Filed Sept. 22, 1969
[45] Patented Nov. 23, 1971
[73] Assignee Harry Zeiler
 Huis ter Heid/Zeist, Netherlands
[32] Priority Sept. 30, 1968
[33] Great Britain
[31] 46,359/68

[54] SUPPORT FOR A DISH
 1 Claim, 4 Drawing Figs.

[52] U.S. Cl. ................................................. 220/70,
 220/1 R, 119/61
[51] Int. Cl. ................................................. B65d 7/42
[50] Field of Search ................................... 220/70, 72,
 13, 83, 97, 1; 119/61; D30/16

[56] References Cited
UNITED STATES PATENTS
| | | | |
|---|---|---|---|
| 3,527,192 | 9/1970 | Ferrara | 220/63 X |
| D.156331 | 12/1949 | French | 30/16 |
| 2,928,372 | 3/1960 | Farley | 119/61 |
| D.200,464 | 3/1965 | Sachnoff et al. | 30/16 |

FOREIGN PATENTS
| | | | |
|---|---|---|---|
| 339,774 | 9/1959 | Switzerland | 119/61 |

Primary Examiner—Raphael H. Schwartz
Attorney—Bacon and Thomas

ABSTRACT: A dish or like container, formed in one piece from a relatively thin sheet of metal or plastics material, said dish being relatively flat and of trapezoidal section, with a peripheral, generally semitoric structure, the opening of which being directed downwardly.

PATENTED NOV 23 1971 3,622,036

INVENTOR.
MATHIEU MAURITS BONGAERTS
BY
Bacon & Thomas
ATTORNEYS

SUPPORT FOR A DISH

This invention concerns a dish or like container which is used for the food and drink of domestic animals.

According to the invention there is provided a dish made in a single piece by shaping a relatively thin sheet of metal or plastics material, said shaping operation being such that the dish is relatively flat and of trapezoidal section, and has peripherally a generally semitoric structure, the opening of which is directed downwardly.

In the preferred embodiment a dish according to the invention has in combination the following features:

a. A hollow food or drink containing bowl which has a flat bottom connected to the lateral wall of said bowl by a rounded portion, the lateral wall of said bowl being of a convex curved shape to which the rounded portion is harmoniously joined;

b. The outer wall of the dish which externally defines the semitoric portion is, over the major part of its height, convex but has an outwardly directed concave portion at its bottom edge, the two-convex walls of the semitoric portion being connected at the top by a bead of relatively small radius;

c. The bottom edge of the external wall of the semitoric portion of the dish is circular and lies in a plane located slightly below the flat bottom of the bowl;

d. The radii of curvature of the convex parts of the walls defining the semitoric portion of the dish are equal or approximately equal;

e. The radius of curvature of the connecting portion between the bottom of the bowl and the internal convex wall of the semitoric portion of the dish is at least half the radius of curvature of the convex walls which define the semitoric portion;

f. The connection between the rounded portion of the bowl and the adjacent convex wall of the semitoric portion of the dish will preferably be such that it has a slight inflexion.

The dish is preferably formed by stamping it in one piece from a single sheet of metal or plastics material, for example stainless steel. Obviously these different features could be used to construct dishes or similar hollow bodies of different depths and diameters. Also, if considered necessary any supplementary elements could subsequently be added to such a dish.

Similarly, and in spite of the fact that the circular shape will be generally preferred, practically all the features disclosed herein could be used to construct noncircular dishes.

Further embodiments could also consist of the construction of oblong dishes, i.e., in which the shape of the dish in plan view is elliptical or oval.

Further features of the invention will become apparent from the following particular description as illustrated in the accompanying drawings, in which.

Figure 1:
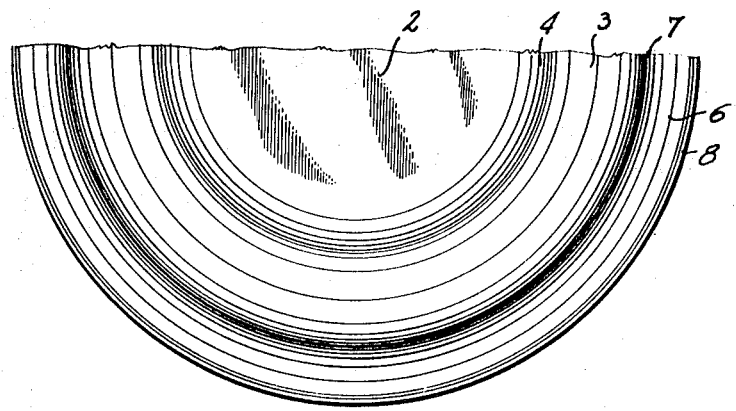
FIG. 1 shows a plan view of one half of a dish according to the invention.
Figure 2:
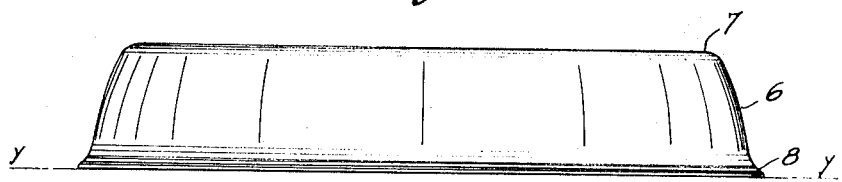
FIG. 2 is an elevation view of the dish according to the invention.
Figure 3:
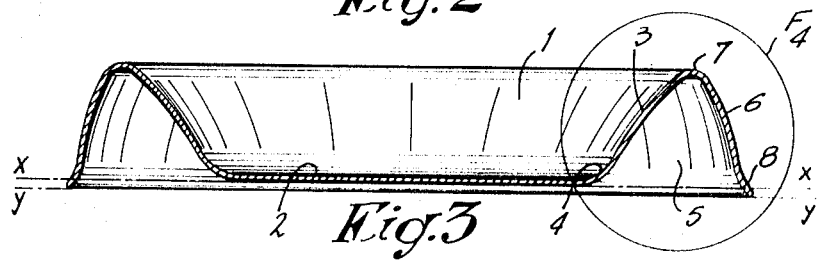
FIG. 3 is a radial cross section of the dish.
Figure 4:
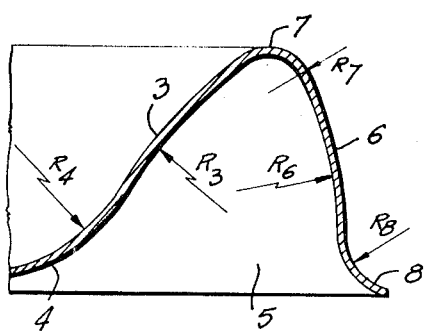
FIG. 4 shows on an enlarged scale the part of FIG. 3 indicated by F4.

In this preferred embodiment, the dish is made of stainless steel and the hollow part 1 has a flat bottom 2 arranged in the plane X—X. The bowl 1 is defined by a lateral frustoconical convex wall 3 with a radius of curvature R3 and is connected to the flat bottom 2 by a concave rounded wall 4 with radius R4 the maximum value of which is equal to one half of R3.

The bowl thus formed is bounded at its periphery by a semitoric ring 5 which is defined on the interior by said walls 3-4 and on the exterior by a wall 6 which is also frustoconical. Over the major part of its height, this external wall 6 is convex and its radius of curvature R6 is equal or approximately equal to R3. At the top, this convex part is connected to the internal convex part 3 by a rounded wall 7, the radius of curvature R7 of which is relatively small and is of the order of one ninth of R3.

At the bottom, the convex part of the wall 6 is extended by a concave curved part directed toward the exterior by a concave outwardly directed part 8.

The radius of curvature R8 of this marginal part may be slightly greater than that of the upper rounded part 7, for example of the order of one half of 3R7. The extreme free end of the marginal concave wall 8 defines a plane Y—Y located below and at a small distance from the plane X—X defined by the flat bottom 2 of the bowl 1.

The dish described in the above embodiment is shaped so that there are no surfaces on which food or drink can readily collect when the dish is emptied. It is also very stable so that the danger of being tipped over by the sudden action of animal is largely avoided.

Being made of stainless steel, the dish described above resists chemical attack both from food or drink contained therein and from the atmosphere which may contain moisture or acid gas or vapor.

What I claim is:

1. A dish or like container having a substantially flat horizontal bottom joined by a first rounded portion and a slight inflexion to an upwardly extending first sidewall of a substantially V-shaped channel having a second sidewall which is joined at its one end to said first sidewall via a second rounded portion and at its other end to an outwardly curved portion, the underside of which lies in a substantially horizontal plane below the bottom of said horizontal bottom, said sidewalls being convex when considered from the inside of said channel and having substantially the same radius curvature, said first rounded portion having a radius of curvature which is equal to at least half the radius of curvature of said convex sidewalls.

* * * * *